United States Patent [19]
Galasso et al.

[11] 3,903,323
[45] Sept. 2, 1975

[54] METHOD FOR PRODUCING BORON FILAMENT HAVING A TITANIUM CARBIDE COATED SUBSTRATE

[75] Inventors: Francis S. Galasso, Manchester; Bernarr A. Jacob, Torrington; Robert B. Graf, Glastonbury, all of Conn.

[73] Assignee: United Aircraft Corporation, Hartford, Conn.

[22] Filed: Dec. 26, 1973

[21] Appl. No.: 427,979

[52] U.S. Cl. ............... 427/52; 427/113; 427/126; 427/249; 427/419; 428/366; 428/367; 428/378; 428/380; 428/389
[51] Int. Cl.² ............... C23C 11/00; D01F 9/12
[58] Field of Search............ 117/106 C, 106 A, 221, 117/228, 215, DIG. 10, DIG. 11, 69; 427/52, 113, 126, 249, 419

[56] References Cited
UNITED STATES PATENTS

| | | | |
|---|---|---|---|
| 2,962,388 | 11/1960 | Ruppert et al. | 117/106 C X |
| 3,120,453 | 2/1964 | Fitzer et al. | 117/217 |
| 3,679,475 | 7/1972 | Basche et al. | 117/69 X |
| 3,692,565 | 9/1972 | Lersmacher et al. | 117/106 C X |

*Primary Examiner*—Ralph Husack
*Attorney, Agent, or Firm*—Stephen E. Revis; Robert C. Walker

[57] ABSTRACT

A method for producing a boron filament with a relatively thick, uniform coating of boron by passing a moving, resistively heated carbon substrate through a reactor in the presence of a boron halide admixed with hydrogen includes the step of first putting a coating of titanium carbide on the carbon substrate.

3 Claims, No Drawings

METHOD FOR PRODUCING BORON FILAMENT HAVING A TITANIUM CARBIDE COATED SUBSTRATE

CROSS-REFERENCE TO RELATED APPLICATION

This application is related to my copending application Ser. No. 427,876 filed on even date herewith in the name of Francis S. Galasso et al. entitled Boron Filament Having a Titanium Carbide Coated Substrate.

BACKGROUND OF THE INVENTION

1. Field of the Invention

This invention relates to improved filaments for use as reinforcements in composite materials and a method of manufacturing the same.

2. Description of the Prior Art

It is known that filamentary boron may be produced by pyrolytic techniques in a process wherein the boron is chemically deposited on a resistively heated carbon monofilament which is exposed to a reactant gas consisting of boron trichloride admixed with hydrogen.

The use of carbon as a filamentary substrate for boron has been recognized as offering the potential of significant improvements in the field of composite materials. Carbon, which in the present disclosure also includes graphitic material, possesses desirable characteristics in the form of electrical conductivity, hot strength, apparent chemical compatibility with boron, low density and an attractive cost feasibility relative to presently used tungsten filamentary substrates. Although the potential of carbon as a substrate is thus recognized, realization of this potential has been limited by the degradation of the carbon fiber during the coating process. It has been observed that although the deposition of boron on the carbon substrate can be initiated uniformly, the coating quickly takes on a bamboo-like appearance with periodic nodes of boron thickened circumferentially along the fiber. The areas of increased deposition are caused by the appearance of a plurality of hot spots along the fiber and subsequent tests have revealed that the hot spots are caused by fractures in the carbon core which produce an irreversable change in the electrical properties of the fiber. It was found that the fractures occur irrespective of whether the process be static or continuous and with the fiber at a uniform temperature. Further investigations have indicated that the substrate fracturing is attributable to an unexpected growth phenomenon. As the boron is deposited on the carbon it undergoes a period of expansion which, when unchecked, exceeds the strength of the carbon filament, and causes fracturing thereof. The exact cause and nature of this phenomenon is imperfectly understood at this time.

Recently, several techniques have been developed to improve the effectiveness of the basic continuous process through the close control of process conditions. In one of these methods a continuous coating of node-free amorphous boron is achieved by carefully limiting resident exposure of the carbon substrate in the reactor to a time period shorter than that at which fracturing occurs. At present however, the thickness of node-free boron which can be deposited on a one mil carbon filament by this technique is limited to a maximum of 0.6 mil to give a composite fiber of 2.2 mils in diameter.

Another technique for solving some of the foregoing problems is described in the commonly owned patent to Bashe et al. U.S. Pat. No. 3,679,475 "Method for Producing Boron-Carbon Fibers". Basche et al. precoats the carbon substrate with pyrolytic graphite prior to depositing the boron. The coating of pyrolytic graphite provides for relative slippage between the boron and the carbon substrate during the deposition process thereby eliminating substrate fracturing and its attendant hot spotting. A serious disadvantage of the foregoing technique is the high temperature required to effect the deposition of pyrolytic graphite on the carbon wire. It is well known in the art that temperatures of greater than 2000°C are required to produce the graphite. At these high temperatures gas evolves from the carbon substrate and weakens it to the extent that it is much more difficult to prevent the substrate from breaking during the deposition processes. This is a different problem from the problem of the carbon fracturing during the step of boron deposition.

SUMMARY OF THE INVENTION

An object of the present invention is a carbon filament with a relatively thick coating of boron having a substantially constant diameter.

A further object of the present invention is an improved method for depositing a relatively thick, substantially constant diameter boron coating on a carbon filament.

Accordingly, a carbon substrate is precoated with an electrically conductive layer of titanium carbide. The titanium carbide coated carbon substrate is passed through a boron deposition reactor whereupon a relatively thick, substantially constant diameter boron coating is deposited on the coated filament.

The titanium carbide coating does not prevent the carbon substrate from fracturing as does the pyrolytic graphite coating of Basche et al., but rather the titanium carbide provides a continuous unbroken path for the electric current through the wire during the boron deposition process despite, fracturing of the carbon substrate, thereby maintaining the proper temperature distribution over the length of the wire within the reactor during boron deposition.

It is not denied that it is well known that boron is compatible with titanium carbide. It is also known to coat carbon in bulk form with a layer of titanium carbide to improve its electrical conductivity. For example, Fitzer et al. U.S. Pat. No. 3,120,453 deposits a coating of titanium carbide on a carbon electrode and then puts a metallic cover layer, which he says may be boron, over the titanium carbide. Further, British patent specification No. 793,730 (1955) coats a carbon rod with silicon carbide and then deposits boron on the rod. These patents, however, relate to coating carbon in bulk form for purposes unrelated to the difficult and different problems involved in forming boron filaments in a reactor. The foregoing British patent specification is merely a method for producing boron which is eventually scraped off the carbon rod and stored; also, the boron deposited on the silicon carbide coated carbon rods is of the crystalline variety, while the boron used to coat the titanium carbide coated carbon filaments of the present invention is of the amorphous type. Deposition of crystalline boron on a carbon substrate does not result in fractures of the substrate but is not as desirable as a coating for other reasons. It therefore would not necessarily follow from the British patent specification that amorphous boron would be compatible with the titanium carbide or that it would adhere properly thereto. The same situation exists with respect to Fitzer et al wherein his boron outer coating is of the crystalline type.

Due to the unique problems involved in the manufacture of boron filaments it was virtually impossible to predict from Fitzer, the British patent, or from Basche et al. that titanium carbide would perform in the manner in which it did when deposited on the wire-like carbon substrate of the present invention. Actually, the success of the process of the present invention was quite unexpected.

The foregoing and other objects, features and advantages of the present invention will become more apparent in the light of the following detailed description of preferred embodiments thereof.

DESCRIPTION OF THE PREFERRED EMBODIMENTS

The step of coating a carbon wire substrate with titanium carbide and then coating the coated substrate with boron may be accomplished in a single reactor such as the reactor shown in the Basche et al. U.S. Pat. No. 3,679,475, the description of which is incorporated herein by reference. It is also to be understood that two sequentially arranged reactors or a two stage reactor (such as shown in commonly owned U.S. Pat. No. 3,549,424 to Rice) may be used for applying the foregoing coatings on the carbon substrate, in the practice of the present invention. The filamentary carbon substrate is drawn through these sequentially disposed reactors and is maintained under a slight tension throughout the coating processes.

In carrying out the process wherein titanium carbide is deposited on the carbon substrate in the reactor, the substrate may be resistively heated to a temperature in the range of 1100° to 1400°C and preferably from 1300° to 1400°C. A diluent gas such as nitrogen, hydrogen or one of the inert gases is introduced into the reactor along with a reactant gas which may be any carbon-containing gas which has been saturated with $TiCl_4$. In particular, satisfactory results have been obtained using methane as the carbon-containing gas in amounts from 5 to 20 mol %, (i.e. from 4 to 19 parts hydrogen to 1 (one) part methane). The restricted concentration of methane in the reactant gas mixture is designed to prevent nodules from forming from too high a concentration and to prevent the formation of soot. A preferred ratio in the reactant gas mixture is fifteen parts $H_2$ to one part $CH_4$. The reaction may be carried out at a pressure of 1 atm. It is also contemplated that the hydrogen rather than the methane may be saturated with the $TiCl_4$.

Titanium carbide coated monofilaments and as received Great Lakes Carbon monofilaments were heated together in a furnace in an atmosphere of air. The Great Lakes monofilament was completely oxidized after 8 hours at 600°C whereas the titanium carbide coated monofilament was still intact after 17 hours at 600°C. In a separate experiment, a titanium carbide coated Great Lakes Carbon monofilament was heated to 750°C and held for one hour. The fiber was still intact after this experience. These tests clearly demonstrate the advantages of the TiC coating even without further coating.

In the present invention boron is pyrolytically deposited on the aforementioned titanium carbide-coated substrate by conventional means. For example, the titanium carbide-coated carbon substrate may be resistively heated to a temperature in the range of 700° to 1400°C preferably 1100° to 1300°C. The reaction may be carried out at a pressure of 1 atm and the reactant gases may contain a boron containing gas (e.g. boron trichloride in an amount of 15 to 75 mol % and a reducing gas, preferably hydrogen, in an amount 85 to 25 mol percent. A preferred ratio of gases is 40 mol % boron trichloride and 60 mol percent hydrogen.

During one investigation, a 0.9 mil carbon monofilament, from Great Lakes Carbon Corporation, having a clean surface substantially free of imperfections and a circular cross section was coated with a layer of titanium carbide prior to boron deposition. The monofilament was passed through a reactor while being maintained at a temperature of 1380°C by passing the proper current therethrough. In the reactor, a gas ratio of $H_2$ to $CH_4$ of 15:1 was maintained. The $CH_4$ was saturated with $TiCl_4$ in an evaporator at 18° to 20°C ambient water temperature and at a pressure of 1.0 psig prior to introducing it into the reactor. The fiber feed rate was such that the fiber remained in the reactor for 30 seconds. After coating, the diameter was 0.986 mil, thus yielding a 0.043 mil thick coating of TiC.

The titanium carbide coated fiber was then passed through a boron deposition reactor. A gas ratio of $H_2$ to $BCl_3$ of 1:1 was maintained. The fiber temperature was maintained at 1150°C during deposition and its feeding speed was such that it remained within the reactor for 17 seconds. The resultant boron fiber diameter was 2.84 mils. Thus, 0.93 mil of boron had been deposited with no detrimental hot spots apparent. Radiographs of the boron fiber showed that the core had been fractured during the boron deposition, but the titanium carbide remained intact and the uniformity of the boron coat was not affected. It is assumed that the highly conductive titanium carbide carried the current even after the core had fractured.

Although the invention has been shown and described with respect to a preferred embodiment thereof, it should be understood by those skilled in the art that various changes and omissions in the form and detail thereof may be made therein without departing from the spirit and scope of the invention.

Having thus described typical embodiments of our invention, that which we claim as new and desire to secure by Letters Patent of the United States is:

1. A method for continuously depositing node-free amorphous boron to uniform thicknesses greater than 0.6 mil on a moving resistively heated carbon wire as it is drawn through a series of reactors comprising the steps of:

maintaining the carbon wire in the first reactor at a temperature of 1100° to 1400°C;

exposing the carbon wire while at said temperature in said first reactor to a gaseous stream consisting essentially of a carbon-containing gas and a diluent gas, at least one of said gases having been saturated with $TiCl_4$, to effect deposition of titanium carbide on the carbon wire;

maintaining the titanium carbide-coated carbon wire in a subsequent reactor at a temperature of 700° to 1400°C; and exposing the wire in said subsequent reactor to a gaseous stream of a boron halide admixed with hydrogen to effect deposition of elemental boron thereon;

said deposit of titanium carbide being disposed to carry the current used to resistively heat the carbon wire should said carbon wire fracture as a result of the boron deposition process.

2. The method of claim 1 wherein said carbon-containing gas is methane and said diluent gas is hydrogen, said hydrogen being present in an amount of four to 19 parts per one part methane.

3. The method of claim 1 wherein said carbon wire in the first reactor is maintained at a temperature of 1300° to 1400°C.

* * * * *